US012808155B2

(12) United States Patent
Fujiwara et al.

(10) Patent No.: US 12,808,155 B2
(45) Date of Patent: Nov. 24, 2026

(54) REMOTE OPERATION ASSISTANCE SYSTEM AND REMOTE OPERATION DEVICE FOR WORK MACHINE

(71) Applicant: KOBELCO CONSTRUCTION MACHINERY CO., LTD., Hiroshima (JP)

(72) Inventors: Yusuke Fujiwara, Hiroshima (JP); Masaki Otani, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 19/114,530

(22) PCT Filed: Oct. 12, 2023

(86) PCT No.: PCT/JP2023/036998
§ 371 (c)(1),
(2) Date: Mar. 24, 2025

(87) PCT Pub. No.: WO2024/090219
PCT Pub. Date: May 2, 2024

(65) Prior Publication Data

US 2026/0168207 A1 Jun. 18, 2026

(30) Foreign Application Priority Data

Oct. 28, 2022 (JP) ................................ 2022-173362

(51) Int. Cl.
*E02F 9/20* (2006.01)
*E02F 9/26* (2006.01)
(Continued)

(52) U.S. Cl.
CPC ................ *E02F 9/205* (2013.01); *E02F 9/26* (2013.01); *G05D 1/2243* (2024.01); (Continued)

(58) Field of Classification Search
CPC .... E02F 9/20; E02F 9/205; E02F 9/26; G05D 1/2243; B65G 65/08; B65G 67/60; B66C 13/04
(Continued)

(56) References Cited

U.S. PATENT DOCUMENTS 6,244,015 B1 * 6/2001 Ito ........................... G06F 3/013 52/741.1
11,821,171 B2 * 11/2023 Saiki ....................... E02F 9/205
12,043,524 B2 * 7/2024 Appling, Jr. ............ H04L 67/12

FOREIGN PATENT DOCUMENTS

JP S61-269548 A 11/1986
JP H02-138997 U 11/1990
(Continued)

OTHER PUBLICATIONS

Extended European Search Report dated Dec. 19, 2025 issued in the corresponding EP Patent Application No. 23882428.8.
(Continued)

*Primary Examiner* — Andrew Joseph Rudy
(74) *Attorney, Agent, or Firm* — Carrier, Shende & Associates P.C.; Joseph P. Carrier; Jeffrey T. Gedeon

(57) ABSTRACT

To provide a remote operation system and a remote operation device for a work machine that enhance operability while avoiding audio feedback caused by a microphone and a speaker respectively provided in the remote operation device and the work machine. Output of work machine-side audio (audio collected by an actual machine external microphone 414) via a remote speaker 222 is reduced or output from the remote speaker 222 is stopped, when remote operation device-side audio (audio collected by a remote microphone 214) is output via an actual machine speaker 422. Thus, collection via the remote microphone 214 of the audio output from the remote speaker 222 is suppressed.

7 Claims, 7 Drawing Sheets

(51) Int. Cl.
*G05D 1/224* (2024.01)
*G05D 105/05* (2024.01)
*G05D 109/10* (2024.01)
*G05D 111/20* (2024.01)

(52) U.S. Cl.
CPC ..... *G05D 2105/05* (2024.01); *G05D 2109/10* (2024.01); *G05D 2111/20* (2024.01)

(58) Field of Classification Search
USPC ........................................................... 701/50
See application file for complete search history.

(56) References Cited

FOREIGN PATENT DOCUMENTS

| | | | |
|---|---|---|---|
| JP | H06-17444 | A | 1/1994 |
| JP | 2000-165967 | A | 6/2000 |
| JP | 2005-354479 | A | 12/2005 |
| JP | 6471030 | B2 | 2/2019 |

OTHER PUBLICATIONS

PCT/ISA/210 from International Application PCT/JP2023/036998 with the English translation thereof.
PCT/ISA/237, Search Opinion from International Application PCT/JP2023/036998.

* cited by examiner

REMOTE OPERATION ASSISTANCE SYSTEM AND REMOTE OPERATION DEVICE FOR WORK MACHINE

TECHNICAL FIELD

The present invention relates to a technique for assisting remote operation by an operator of a work machine such as a hydraulic shovel.

BACKGROUND ART

In a remote operation device for remotely operating a work machine at a remote location, a technique has been proposed for grasping conditions of a job site through audio in addition to sight (for example, see Patent Literature 1). To be specific, a microphone is provided in a work machine and a speaker that outputs audio collected via the microphone is provided in a remote operation device.

CITATION LIST

Patent Literature

Patent Literature 1: Japanese Patent Laid-Open No. 06-017444

SUMMARY OF INVENTION

Technical Problem

It is conceivable to provide a microphone in a remote operation device and provide a speaker that outputs audio of an operator collected via the microphone in a work machine, in order to make it possible for the operator to convey a message to a worker in a vicinity of the work machine by using the audio. In this case, it is possible that the microphone and the speaker respectively provided in the remote operation device and the work machine cause audio feedback.

The present invention has an object to provide a remote operation system and a remote operation device for a work machine that enhance operability while avoiding audio feedback caused by a microphone and a speaker respectively provided in the remote operation device and the work machine.

Solution to Problem

A remote operation assistance system according to the present invention is a remote operation assistance system for assisting work of a work machine via a remote operation device, the remote operation assistance system including:

- an actual machine microphone that is installed in the work machine and collects audio from the work machine side as work machine-side audio;
- a remote speaker that is installed in the remote operation device and outputs the work machine-side audio collected via the actual machine microphone;
- a remote microphone that is installed in the remote operation device and collects audio from the remote operation device side as remote operation device-side audio; and
- an actual machine speaker that is installed in the work machine and outputs the remote operation device-side audio collected via the remote microphone, wherein
- output of the work machine-side audio via the remote speaker is reduced or output of the work machine-side audio via the remote speaker is stopped, when the remote operation device-side audio is output via the actual machine speaker.

With the remote operation assistance system according to the configuration, collection via the remote microphone of the audio output from the remote speaker is suppressed, since output of the work machine-side audio via the remote speaker is reduced or output from the remote speaker output is stopped, when the remote operation device-side audio is output via the actual machine speaker. With this, operability can be enhanced since audio feedback at the actual machine microphone and the actual machine speaker, and audio feedback at the remote microphone and the remote speaker is avoided.

The remote operation assistance system according to the configuration, wherein the work machine-side audio is preferably output via the remote speaker when the remote operation device-side audio is not output via the actual machine speaker, and the work machine-side audio is preferably output via the remote speaker at a reduced rate more than when the remote operation device-side audio is output via the actual machine speaker or the output from the remote speaker is preferably stopped when the remote operation device-side audio is output via the actual machine speaker.

The remote operation assistance system according to the configuration, it is possible for an operator to grasp conditions of the work machine and a job site in a surrounding area of a work site by using the work machine-side audio, since the work machine-side audio is output via the remote speaker, when the remote operation device-side audio is not output via the actual machine speaker. Audio feedback at the actual machine microphone and the actual machine speaker, and audio feedback at the remote microphone and the remote speaker is avoided, since the audio output from the remote speaker is no longer collected via the remote microphone, when the remote operation device-side audio is output via the actual machine speaker.

The remote operation assistance system according to the configuration, further including a switching device that switches between an output state in which the remote operation device-side audio is output via the actual machine speaker and a non-output state in which the remote operation device-side audio is not output, wherein

- the work machine-side audio is preferably output via the remote speaker when the non-output state is designated by the switching device, and the work machine-side audio is preferably output via the remote speaker at a reduced rate more than when the remote operation device-side audio is output via the actual machine speaker or the output from the remote speaker is preferably stopped when the output state is designated by the switching device.

With the remote operation assistance system according to the configuration, it is possible for the switching device to switch between the output state and the non-output state of the remote operation device-side audio via the actual machine speaker. With this, it is possible for the operator to switch between execution and non-execution of transmission processing of the remote operation device-side audio at a timing of choice, thereby improving operability of the work machine via the remote operation device.

The remote operation assistance system according to the configuration, wherein simulated audio simulating the work machine-side audio is preferably output to the remote speaker, when the remote operation device-side audio is output via the actual machine speaker.

With the remote operation assistance system according to the configuration, a sense of discomfort given to the operator is reduced, which may reduce the possibility of inappropriate forms of remote operation of the work machine by the operator more than when the work machine-side audio is not output from the remote speaker when the remote operation device-side audio is not output via the actual machine speaker, since the simulated audio is output to the remote speaker instead of the work machine-side audio when the remote operation device-side audio is output via the actual machine speaker.

The remote operation assistance system according to the configuration, further including an actual machine actuation conditions recognition element that recognizes actuation conditions of the work machine, wherein the audio control device preferably outputs the simulated audio generated based on the actuation conditions of the work machine recognized by the actual machine actuation conditions recognition element to the remote speaker.

With the remote operation assistance system according to the configuration, a sense of discomfort given to the operator is further reduced, which may further reduce the possibility of inappropriate forms of remote operation of the work machine by the operator, a correlation between audio produced by actuation work machine output from the remote speaker and simulated audio generated based on the actuation conditions of the work machine can be enhanced, when the remote operation device-side audio is not output via the actual machine speaker.

The remote operation assistance system according to the configuration, preferably further including a notification device that notifies when the audio control device reduces the output of the work machine-side audio via the remote speaker or stops the output from the remote speaker.

With the remote operation assistance system according to the configuration, it is possible to notify the operator via the notification device that output of the work machine-side audio is reduced or that output from the remote speaker is stopped.

The remote operation assistance system according to the configuration, wherein the work machine is preferably actuated based on an operation mode of a remote operation mechanism that is installed in the remote operation device and accepts an operation by an operator when the remote operation device-side audio is not output via the actual machine speaker, and actuation of the work machine is preferably restricted based on the operation mode of the remote operation mechanism when the remote operation device-side audio is output via the actual machine speaker.

With the remote operation assistance system according to the configuration, it is possible restrict actuation of the work machine based on the operation mode of the remote operation mechanism, when output of the work machine-side audio via the remote speaker is reduced or output from the remote speaker is stopped. This makes it possible to restrict and suppress remote operation of the work machine by the operator in a situation where it is difficult to grasp the conditions of the work machine and the job site in the surrounding area of the work site by using the work machine-side audio.

A remote operation device for a work machine according to the present invention is a remote operation device for assisting remote operation of a work machine, the remote operation device including: a remote speaker that outputs work machine-side audio collected via an actual machine microphone installed in the work machine; and a remote microphone that collects remote operation device-side audio output via an actual machine speaker installed in the work machine, wherein output of the work machine-side audio via the remote speaker is reduced or output of the work machine-side audio via the remote speaker is stopped, when the remote operation device-side audio is output via the actual machine speaker.

With the remote operation device for the work machine according to the configuration, collection via the remote microphone of the work machine-side audio output from the remote speaker is suppressed, since output of the work machine-side audio via the remote speaker is reduced or output from the remote speaker output is stopped, when the remote operation device-side audio is output via the actual machine speaker. With this, operability can be enhanced since audio feedback at the actual machine microphone and the actual machine speaker, and audio feedback at the remote microphone and the remote speaker is avoided.

DESCRIPTION OF EMBODIMENTS

Configuration of Remote Operation Assistance System

Figure 1:
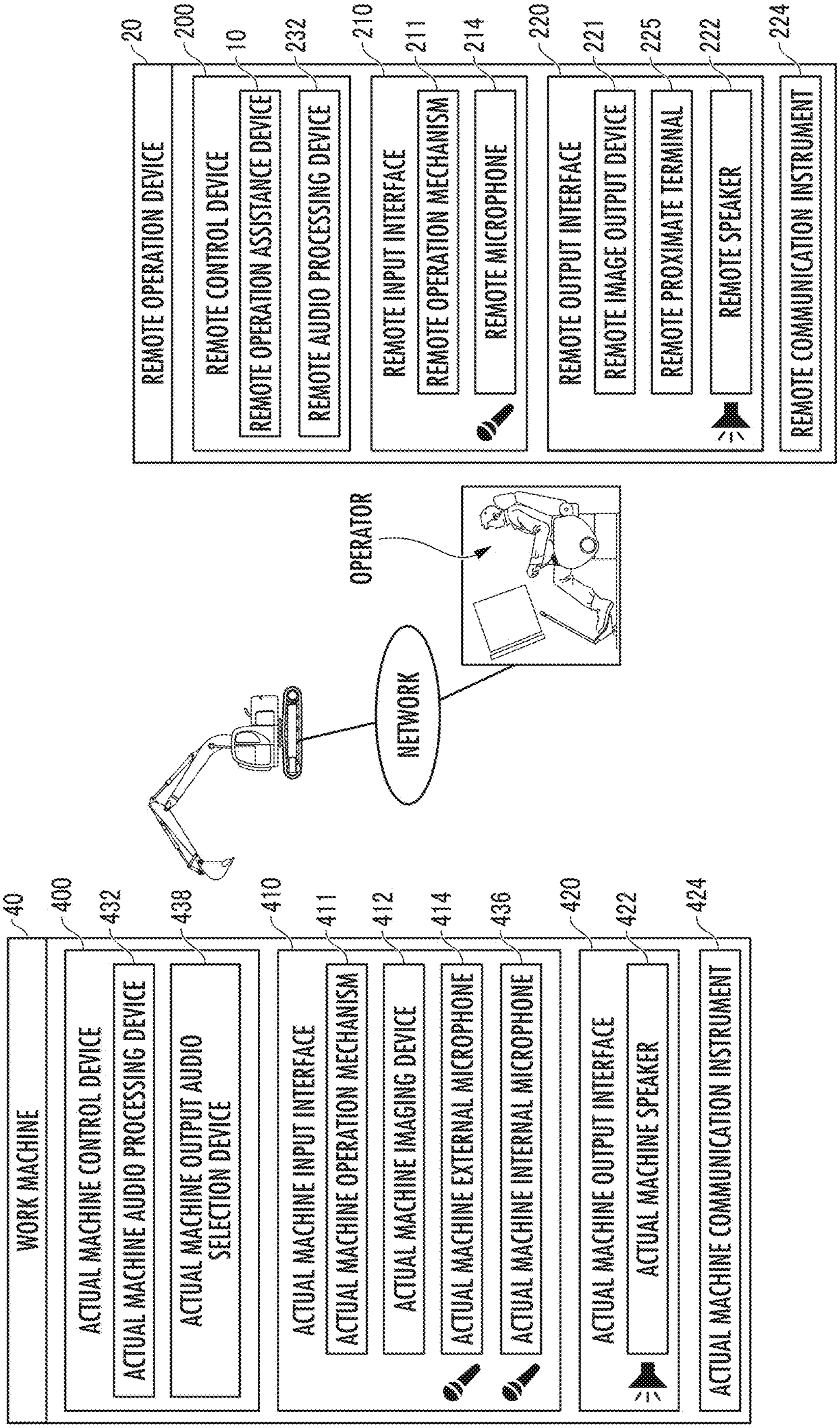
FIG. 1 is an explanatory diagram relating to a configuration of a remote operation assistance system.

A remote operation assistance system as an embodiment according to the present invention shown in FIG. 1 includes a remote operation assistance device 10, a remote operation device 20, and a work machine 40. The remote operation device 20 and the work machine 40 are communicable with each other via a network. The network may be at least one of a wireless network or a wired network.

Configuration of Remote Operation Assistance Device

The remote operation assistance device 10 includes, for example, a computer. The remote operation assistance device 10 includes an arithmetic processing device (single-core processor, multi-core processor, or processor core including the same), reads necessary data and software from a store device such as a memory, and executes arithmetic processing (described below) in accordance with the software with the data as a target thereof.

A component according to the present invention "recognizing" information (or data) encompasses all processing of preparing the information such that the information can be used when executing subsequent processing, such as determining, measuring, identifying, estimating, or predicting the information by receiving the information, performing recognition through reading or searching, or by performing arithmetic processing on underlying data or signals.

Configuration of Remote Operation Device

As shown in FIG. 1, the remote operation device 20 includes a remote control device 200, a remote input interface 210, a remote output interface 220, and a remote communication instrument 224.

The remote control device 200 includes a controller 231 and a remote audio processing device 232.

Figure 2:
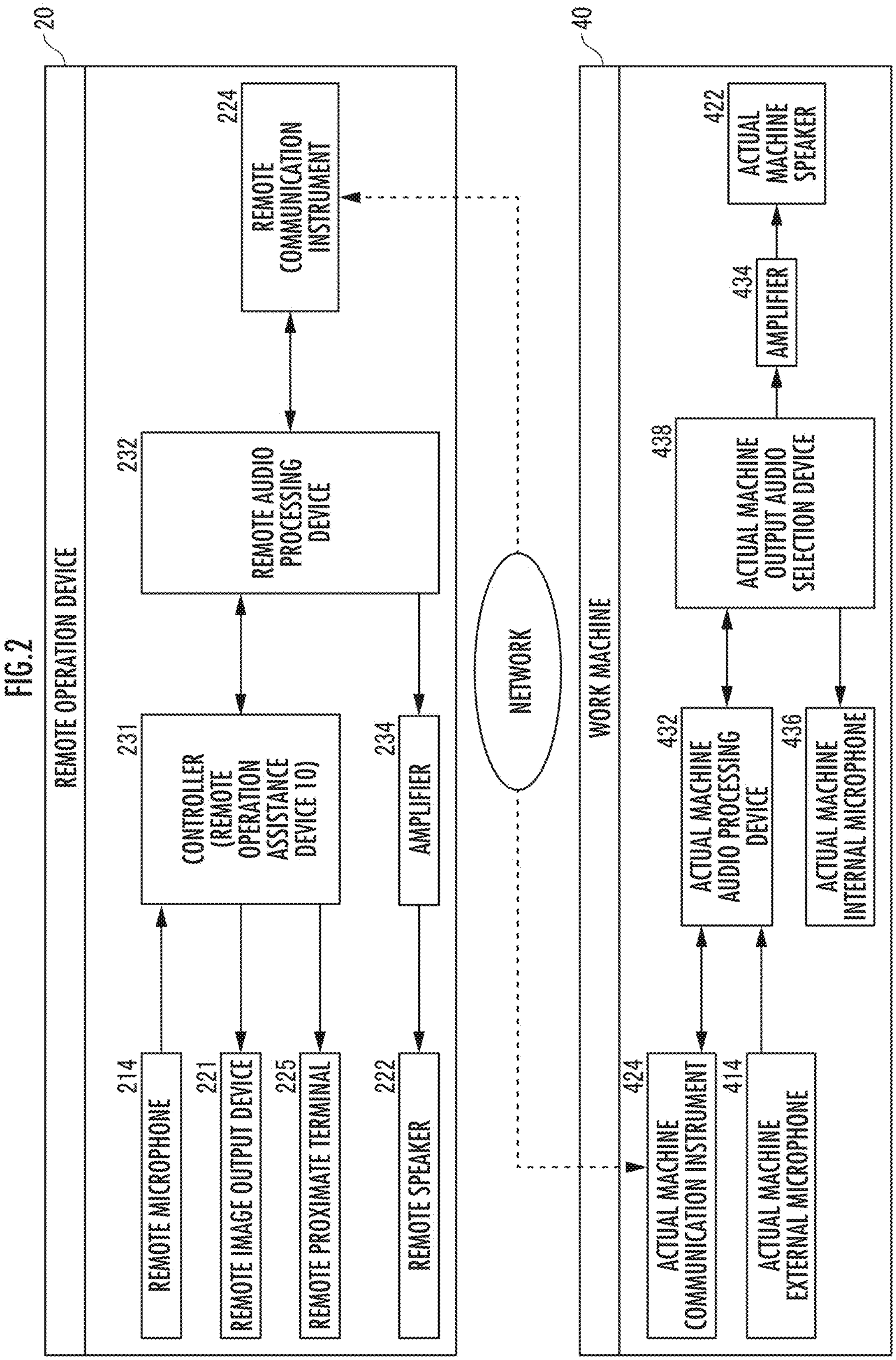
FIG. 2 is an explanatory diagram relating to element functions of the remote operation assistance system.

As shown in FIG. 1 and FIG. 2, the controller 231 functions as the remote operation assistance device 10. The controller 231 includes a computer separate from a computer included in the remote control device 200, and may be communicable with the remote control device 200 via a local network (vehicle network such as a CAN).

An electrical signal corresponding to sound collected by a remote microphone 214 is input to the controller 231, and the electrical signal is input to the remote audio processing device 232. The remote operation assistance device 10 causes a remote image output device 221, a proximate terminal 225, or the like to output an image.

The remote audio processing device 232 receives an electrical signal transmitted by the controller 231, compression-codes audio data information corresponding to the electrical signal, and transmits the audio data information to the remote communication instrument 224. The remote audio processing device 232 decompresses and restores the audio data information transmitted via the remote communication instrument 224, and outputs an electrical signal corresponding to the restored audio data information to the controller 231 and an amplifier 234. The amplifier 234 amplifies the input electrical signal.

As shown in FIG. 1, the remote input interface 210 includes a remote operation mechanism 211 and the remote microphone 214.

The remote operation mechanism 211 includes an operation device for traveling, an operation device for rotating, an operation device for a boom, an operation device for an arm, and an operation device for a bucket. Each of the operation devices includes an operation lever accepting a rotation operation. The operation lever of the operation device for traveling (travel lever) is operated for moving a lower travel body 41 of the work machine 40. The travel lever may also serve as a travel pedal. For example, the travel pedal may be provided fixed to a base portion or lower end portion of the travel lever. The operation lever of the operation device for rotating (rotation lever) is operated for moving a hydraulic rotation motor included in a rotation mechanism 43 of the work machine 40. The operation lever of the operation device for the boom (boom lever) is operated for moving a boom cylinder 442 of the work machine 40. The operation lever of the operation device for the arm (arm lever) is operated for moving an arm cylinder 444 of the work machine 40. The operation lever of the operation device for the bucket (bucket lever) is operated for moving a bucket cylinder 446 of the work machine 40.

Figure 3:
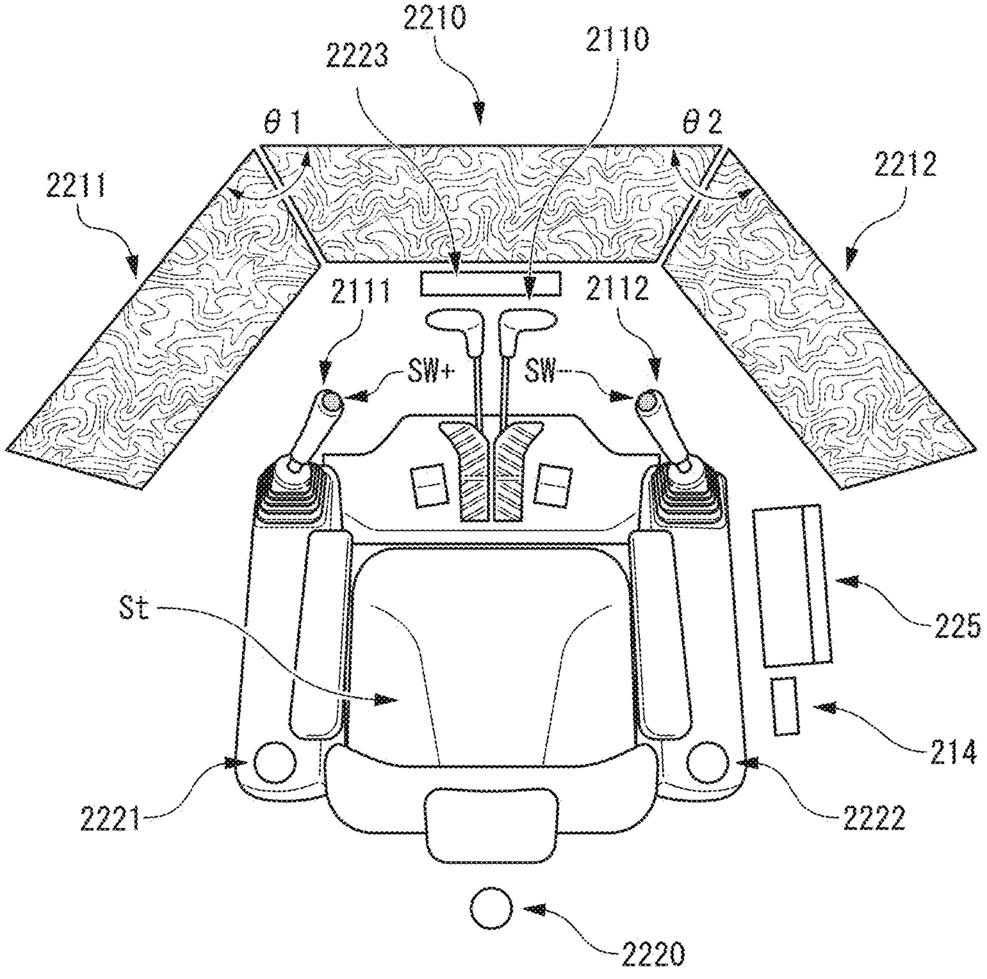
FIG. 3 is an explanatory diagram relating to a configuration of a remote operation device.

As shown in FIG. 3, each of the operation levers included in the remote operation mechanism 211 is, for example, disposed around a seat St for seating an operator. The seat St takes the form of a high-back chair with an armrest, but may take any form for allowing the operator to sit, such as a low-back chair without a headrest or a chair without a backrest.

A pair of left and right travel levers 2110 corresponding to left and right crawlers may be disposed laterally in front of the seat St. One operation lever may also serve as a plurality of operation levers. For example, a left-side operation lever 2111 provided in front of a left-side frame of the seat St shown in FIG. 3 may function as an arm lever when operated in a front-rear direction and function as a rotation lever when operated in a left-right direction. Similarly, a right-side operation lever 2112 provided in front of a right-side frame of the seat St shown in FIG. 3 may function as a boom lever when operated in the front-rear direction and function as a bucket lever when operated in the left-right direction. A lever pattern may be freely changed in response to a predetermined operation on the remote input interface 210 by the operator.

The remote microphone 214 is a device that collects sound in a space of the remote operation device 20 and converts the sound to an electrical signal, and is disposed for collecting speech of the operator of the remote operation device 20. For example, as shown in FIG. 3, the remote microphone 214 is disposed on a side of the seat St. The remote microphone 214 may be a fixed microphone or may a microphone with a changeable attaching position having a detachable clip or the like. A hands-free microphone may be used as the remote microphone 214. In the present embodiment, the remote microphone 214 includes a switch (switching device) for enabling and disabling a function of collecting sound in the space of the remote operation device 20.

As shown in FIG. 1, the remote output interface 220 includes the remote image output device 221, a remote speaker 222 (remote audio output device), and the proximate terminal 225.

As shown in FIG. 3, the remote image output device 221 includes a central remote image output device 2210, a left-side remote image output device 2211, and a right-side remote image output device 2212 each including a substantially rectangular screen respectively disposed in front, left diagonally in front, and right diagonally in front of the seat St. The respective screens (image display regions) of the central remote image output device 2210, the left-side remote image output device 2211, and the right-side remote image output device 2212 may be the same in shape and size or may be different. The remote image output device 221 may be a single curved or curvable image output device, or may consist of two or four or more image output devices disposed so as to surround the front of the seat St. The remote image output device 221 may be an image output device including an information terminal device carried by the operator operating the remote operation device 20.

As shown in FIG. 3, a right edge of the left-side remote image output device 2211 is adjacent to a left edge of the central remote image output device 2210 so that the screen of the central remote image output device 2210 and the screen of the left-side remote image output device 2211 form an inclination angle $\theta 1$ (for example, $120° \leq \theta 1 \leq 150°$). As shown in FIG. 3, a left edge of the right-side remote image output device 2212 is adjacent to a right edge of the central remote image output device 2210 so that the screen of the central remote image output device 2210 and the screen of the right-side remote image output device 2212 form an inclination angle $\theta 2$ (for example, $120° \leq \theta 2 \leq 150°$). The inclination angles $\theta 1$ and $\theta 2$ may be the same or different.

The respective screens of the central remote image output device 2210, the left-side remote image output device 2211, and the right-side remote image output device 2212 may be parallel to a vertical direction or may be inclined with respect to the vertical direction. At least one image output device among the central remote image output device 2210, the left-side remote image output device 2211, and the right-side remote image output device 2212 may be divided into a plurality of image output devices. For example, the central remote image output device 2210 may consist of vertically adjacent image output devices including substantially rectangular screens.

The remote speaker 222 is a device that emits audio based on an electrical signal output via the amplifier 234, and is disposed for providing audio to the operator of the remote operation device 20. The remote speaker 222 consists of one or more speakers and includes, for example, a front remote speaker 2223 disposed in front of the seat St as shown in FIG. 3. In addition to the front remote speaker 2223 or instead of the front remote speaker 2223, the remote speaker 222 may consist of a central remote speaker 2220, a left-side remote speaker 2221, and a right-side remote speaker 2222 respectively disposed behind the seat St, in a rear portion of a left arm rest, and a rear portion of a right arm rest. Respective specifications of the central remote speaker 2220, the left-side remote speaker 2221, and the right-side remote speaker 2222 may be the same or may be different.

The proximate terminal 225 displays various screens on a display screen based on a signal from the remote control device 200. The proximate terminal 225 may function as the remote input interface 210 that outputs a signal to the controller 231 through a touch operation by the operator, the signal indicating that the remote input interface 210 is operated by the operator.

The remote communication instrument 224 is an instrument that enables network communication of the remote operation device 20 and communicates with the work machine 40 via the network.

Configuration of Work Machine

As shown in FIG. 1, the work machine 40 includes an actual machine control device 400, an actual machine input interface 410, an actual machine output interface 420, and an actual machine communication instrument 424. The actual machine control device 400 includes an arithmetic processing device (single-core processor, multi-core processor, or processor core including the same), reads necessary data and software from a store device such as a memory, and executes arithmetic processing in accordance with the software with the data as a target thereof.

Figure 4:
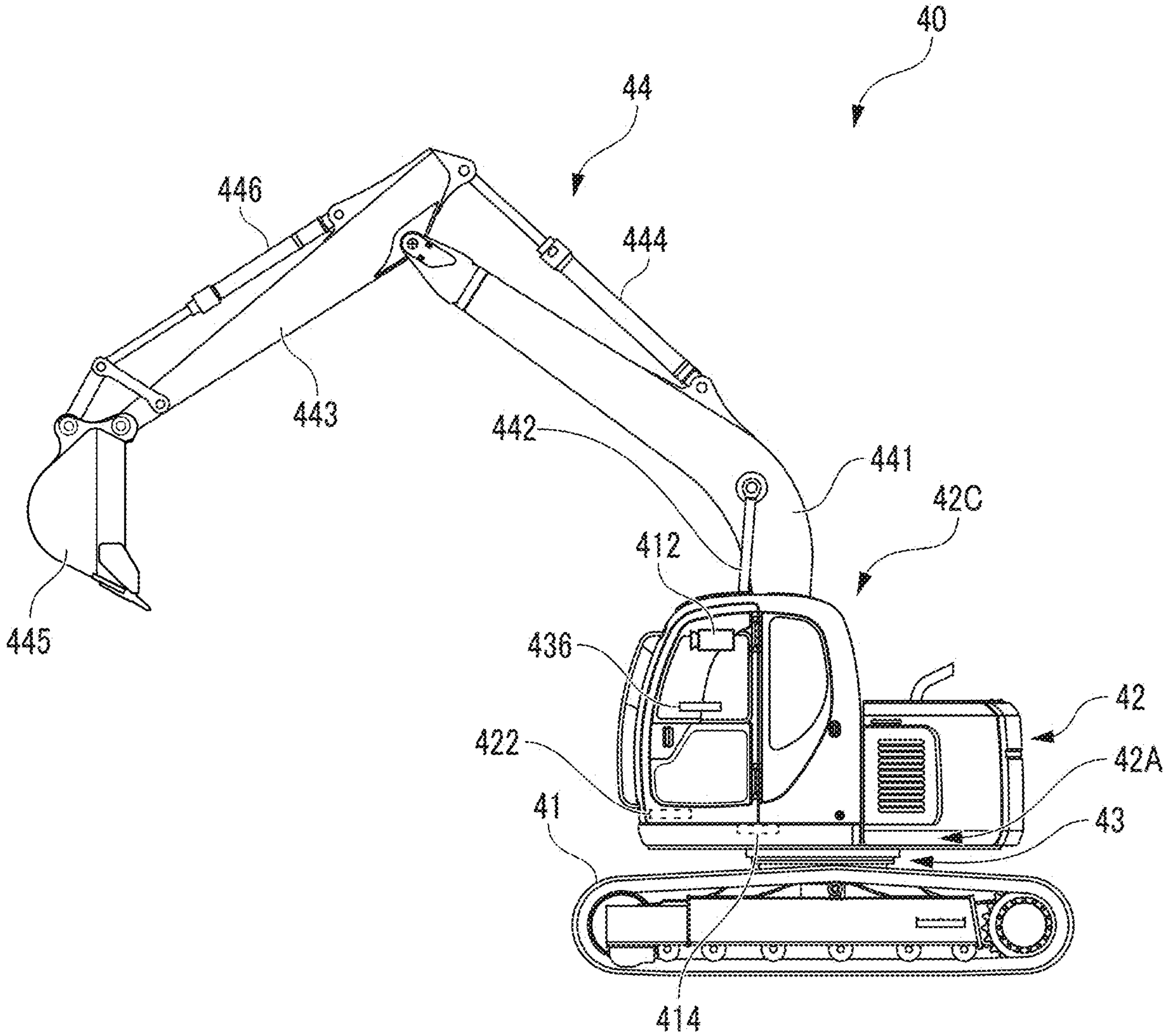
FIG. 4 is an explanatory diagram relating to a configuration of a work machine.

The work machine 40 is, for example, a crawler excavator (construction machine). As shown in FIG. 4, the work machine 40 includes the crawler-type lower travel body 41 and an upper rotation body 42 rotatably mounted on the lower travel body 41 via the rotation mechanism 43. A cab (driver's cabin) 42C is provided at a front left-side portion of the upper rotation body 42. A work mechanism 44 is provided at a front center portion of the upper rotation body 42. A pump that supplies hydraulic oil and a prime mover such as an engine or an electric motor that drives the pump are installed in a machine chamber behind the upper rotation body 42.

The work mechanism 44 includes a boom 441 liftably mounted on the upper rotation body 42, an arm 443 rotatably coupled to a distal end of the boom 441, and a bucket 445 rotatably coupled to a distal end of the arm 443. The boom cylinder 442, the arm cylinder 444, and the bucket cylinder 446 consisting of extendable hydraulic cylinders are mounted to the work mechanism 44.

The boom cylinder 442 extends and contracts by being supplied with hydraulic oil, and is interposed between the boom 441 and the upper rotation body 42 so as to rotate the boom 441 in a luffing direction. The arm cylinder 444 extends and contracts by being supplied with hydraulic oil, and is interposed between the arm 443 and the boom 441 so as to rotate the arm 443 about a horizontal axis with respect to the boom 441. The bucket cylinder 446 extends and contracts by being supplied with hydraulic oil, and is interposed between the bucket 445 and the arm 443 so as to rotate the bucket 445 about a horizontal axis with respect to the arm 443.

As shown in FIG. 1, the actual machine control device 400 includes an actual machine audio processing device 432 and an actual machine output audio selection device 438.

As shown in FIG. 2, an electrical signal corresponding to sound collected by an actual machine external microphone 414 is input to the actual machine audio processing device 432, and audio data information corresponding to the electrical signal is compression-coded and input to the actual machine communication instrument 424. The actual machine audio processing device 432 decompresses and restores the audio data information transmitted via the actual machine communication instrument 424, and transmits the restored audio data information to the actual machine output audio selection device 438.

As shown in FIG. 2, an electrical signal corresponding to sound collected by an actual machine internal microphone 436 and an electrical signal corresponding to the audio data information restored via the actual machine audio processing device 432 are input to the actual machine output audio selection device 438. The actual machine output audio selection device 438 selects one of the two input electrical signals and outputs the selected electrical signal to an amplifier 434. For example, the actual machine output audio selection device 438 selects the electrical signal corresponding to the sound collected by the actual machine external microphone 414 and outputs the electrical signal to the amplifier 434, when the work machine 40 is operated by the operator seated inside the cab 42C of the work machine 40. The actual machine output audio selection device 438 selects the electrical signal corresponding to the audio data information transmitted via the actual machine communication instrument 424 and outputs the electrical signal to the amplifier 434, when the work machine 40 is remotely operated by the operator operating the remote operation device 20. The actual machine output audio selection device 438 may be equipped with a function of outputting the electrical signal corresponding to the sound collected by the actual machine internal microphone 436 to the amplifier 434. The amplifier 434 amplifies the input electrical signal.

As shown in FIG. 1, the actual machine input interface 410 includes an actual machine operation mechanism 411, an actual machine imaging device 412, the actual machine external microphone 414, and the actual machine internal microphone 436.

The actual machine operation mechanism 411 includes a plurality of operation levers disposed around a seat in the cab 42C, similarly to the remote operation mechanism 211. A driving mechanism or a robot that receives a signal in accordance with an operation mode of the remote operation levers and moves the actual machine operation levers based on the received signal is provided in the cab 42C.

As shown in FIG. 4, the actual machine imaging device 412 is, for example, disposed inside the cab 42C, and images an environment including at least a portion of the work mechanism 44 from a front window and left and right side windows. A portion or an entirety of the front window and the side windows may be omitted.

The actual machine external microphone 414 is a device that collects sound in a surrounding area of the work machine 40 and converts the sound to an electrical signal, and is disposed outside of the cab 42C. For example, as shown in FIG. 4, the actual machine external microphone 414 is disposed in a space defined by an underfloor member of the cab 42C and a rotation frame 42A above the rotation frame 42A of the upper rotation body 42 including a base plate supporting the cab 42C. The actual machine external microphone 414 may be disposed in another place such as an upper surface of the upper rotation body 42.

The actual machine internal microphone 436 is a device that collects sound in an internal space of the cab 42C and converts the sound to an electrical signal, and is disposed inside the cab 42C for collecting speech of the operator seated inside the work machine 40. For example, as shown in FIG. 4, the microphone 436 for use in the actual machine cab is disposed closer to a side of the internal space of the cab 42C. The actual machine internal microphone 436 may be a fixed microphone or may a microphone with a changeable attaching position having a detachable clip or the like. A hands-free microphone may be used as the microphone 436 for use in the actual machine. The actual machine internal microphone 436 may include a switch that can enable and disable a function of collecting sound in the internal space of the cab 42C. As shown in FIG. 1, the actual machine output interface 420 includes an actual machine speaker 422. The actual machine speaker 422 is a device that emits audio based on an electrical signal output via the amplifier 434, and is disposed outside of the cab 42C for providing audio toward a surrounding area of the work machine 40. For example, as shown in FIG. 4, the actual machine speaker 422 is disposed on the rotation frame 42A and more toward a front side than a portion at which the boom 441 is attached to the upper rotation body 42, and audio is emitted from the actual machine speaker 422 frontward of the upper rotation body 42. The actual machine speaker 422 may be disposed so as to emit audio to a left and right or rearward of the upper rotation body 42 being different from frontward of the upper rotation body 42. A plurality of actual machine speakers 422 may be disposed.

Audio Feedback

A summary of audio feedback suppressed by the remote operation assistance device 10 according to the above-described configuration will be described with reference to FIG. 5A and FIG. 5B.

Figure 5A:
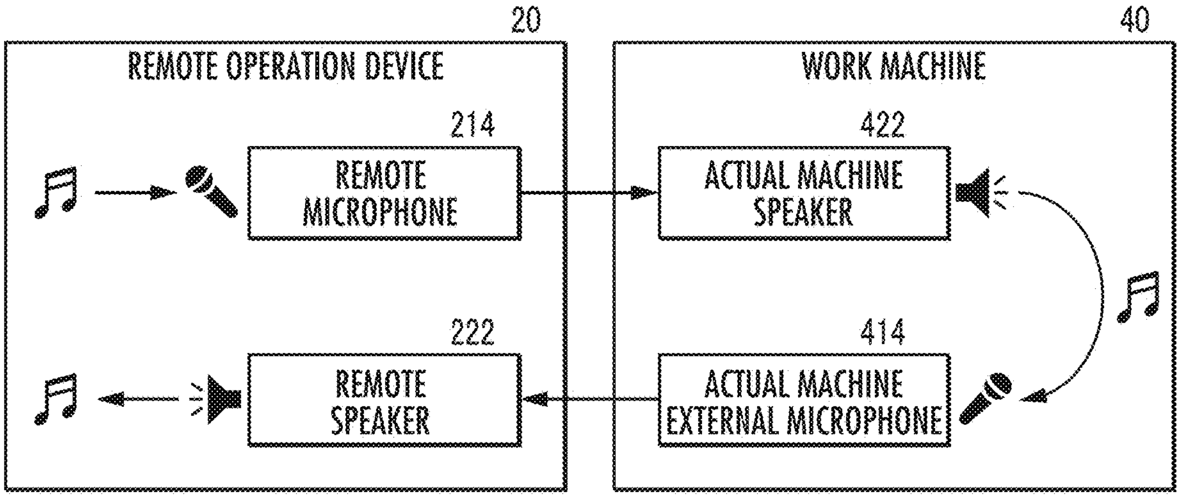
FIG. 5A is an explanatory diagram relating to a first audio loop.

FIG. 5A is a conceptual diagram showing a first audio loop. According to the first audio loop shown in FIG. 5A, when remote operation device-side audio (speech of the operator of the remote operation device 20 and the like) is input to the remote microphone 214, audio data corresponding to the audio is transmitted from the remote operation device 20 to the work machine 40 via the network and is output from the actual machine speaker 422 via the amplifier 434. A portion of the audio output from the actual machine speaker 422 is collected by the actual machine external microphone 414, transmitted from the work machine 40 to the remote operation device 20 via the network as audio data, and output from the remote speaker 222 via the amplifier 234.

Figure 5B:
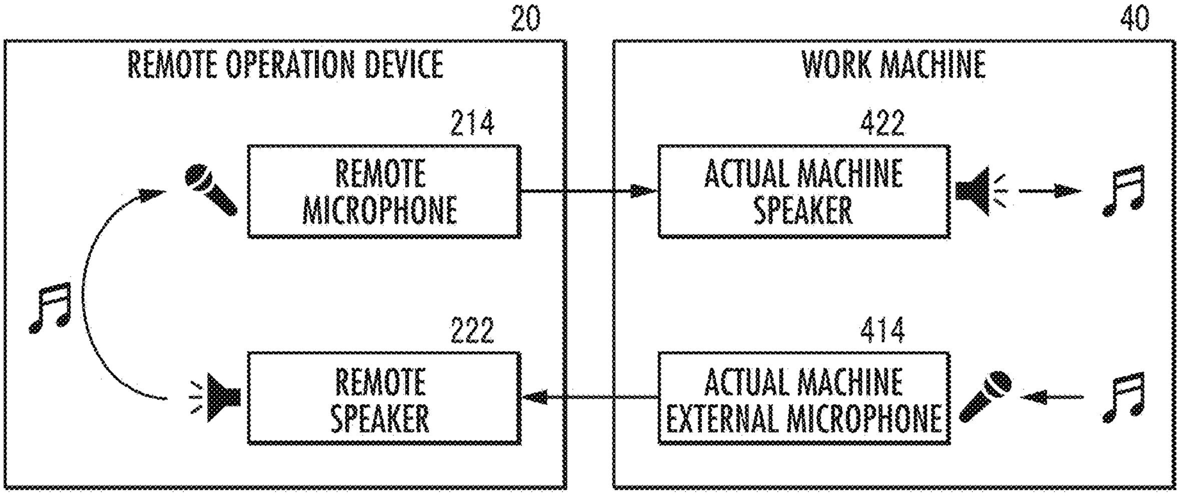
FIG. 5B is an explanatory diagram relating to a second audio loop.

FIG. 5B is a conceptual diagram showing a second audio loop. According to the second audio loop shown in FIG. 5B, when work machine-side audio (audio in the surrounding area of the work machine 40, audio of the prime mover and/or a hydraulic motor of the work machine 40, and the like) is input to the actual machine external microphone 414, audio data corresponding to the audio is transmitted from the work machine 40 to the remote operation device 20 via the network and is output from the remote speaker 222 via the amplifier 234. A portion of the audio output from the remote speaker 222 is collected by the remote microphone 214, transmitted from the remote operation device 20 to the work machine 40 via the network as audio data, and is output from the actual machine speaker 422 via the amplifier 434.

In this manner, each of the first audio loop and the second audio loop is realized in response to an operation by the operator on the remote input interface 210 and/or the actual machine input interface 410, which may cause audio feedback.

In general, when outputting speech from a speaker, a microphone is generally muted when approaching the speaker as a method for avoiding audio feedback. For example, when the remote audio processing device 232 causes the remote speaker 222 to produce audio based on the audio data information transmitted via the remote communication instrument 224, the first audio loop and the second audio loop can be stopped from being generated by stopping audio collection by the remote microphone 214 and muting the remote microphone 214. Upon adopting this method, however, it is no longer possible for the actual machine speaker 422 to output remote operation device-side audio such as speech of the operator collected by the remote microphone 214, when causing the remote speaker 222 to produce audio.

For example, when the actual machine audio processing device 432 causes the actual machine speaker 422 to produce audio based on the audio data information transmitted via the actual machine communication instrument 424, the first audio loop and the second audio loop can be stopped from being generated by stopping audio collection by the actual machine external microphone 414, the actual machine internal microphone 436, and the like, and muting the microphones. Upon adopting this method, however, information about the work machine-side audio is not provided to the remote operation device 20, when causing the actual machine speaker 422 to produce audio.

Processing of removing (filtering) sound frequencies corresponding to audio output from a speaker from sound collected by a microphone is performed as another method for avoiding audio feedback. For example, when the remote audio processing device 232 causes the remote speaker 222 to produce audio based on the audio data information transmitted via the remote communication instrument 224, the first audio loop and the second audio loop can be stopped from being generated by removing a frequency component corresponding to the audio output to the remote speaker 222 from the audio data collected by the remote microphone 214. Alternatively, when the actual machine audio processing device 432 causes the actual machine speaker 422 to produce audio based on the audio data information transmitted via the actual machine communication instrument 424, the first audio loop and the second audio loop can be stopped from being generated by removing a frequency component corresponding to the audio output to the actual machine speaker 422 from the audio data collected by the actual machine external microphone 414, the actual machine internal microphone 436, and the like.

Even when adopting this method, however, it is predicted that generation of the first audio loop and the second audio loop cannot be fully eliminated. For example, it is predicted that the frequency component corresponding to the audio output to the actual machine speaker 422 cannot be fully removed due to a change in the quality of echo audio caused by structures in the surrounding area of the work machine 40 or a change in a timing at which the echo audio is collected by the remote microphone 214. In particular, when the work machine 40 is equipped with a plurality of actual machine speakers 422, the timing at which the echo sound caused by the structures in the surrounding area of the work machine 40 is collected by the remote microphone 214 becomes complicated. When performing work with the work machine 40, the first audio loop and the second audio loop are likely to be generated by a specific frequency with a high volume when the frequency component cannot be fully be removed, since a loud sound is produced when the work mechanism 44 contacts a work target, for example.

Function

Figure 6:
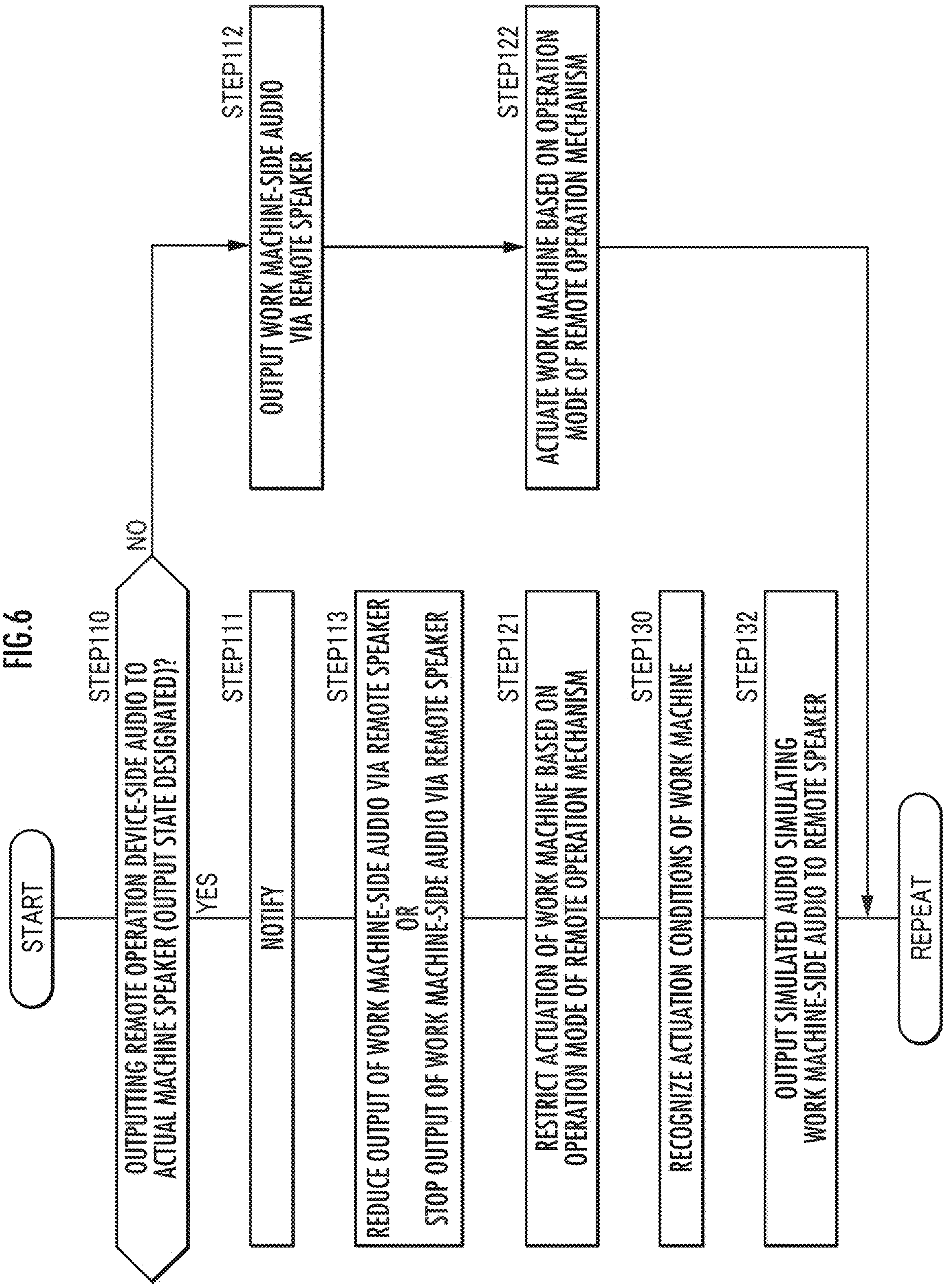
FIG. 6 is an explanatory diagram relating to a function of the remote operation assistance system.

The remote operation assistance device 10 according to the above-described configuration is a device for solving the problems in the methods for avoiding the audio feedback described above. A function of the remote operation assistance device 10 will be described with reference to a flowchart shown in FIG. 6.

First, it is determined whether the actual machine speaker 422 is in a state (output state) of outputting remote operation device-side audio input to the remote microphone 214 (FIG. 4/STEP 110). To be specific, it is determined which one of an output state in which the function of collecting sound from the space of the remote operation device 20 is enabled or a non-output state in which the function of collecting sound is disabled is designated through a push button-type switch (switching device).

When the output state is determined in which the actual machine speaker 422 outputs the remote operation device-side audio (FIG. 4/YES in STEP 110), a notification is output via the remote speaker 222 and/or the remote image output device 221 (or a light emission device including the remote output interface 220)(FIG. 4/STEP **11*l*). The notification is for allowing the operator to recognize that the audio output of the work machine 40 via the remote speaker 222 is to be reduced or that the audio output of the work machine 40 via the remote speaker 222 is to be stopped. The notification may be output to the proximate terminal 225**. Note that the notification processing may be omitted.

Accordingly, the audio output (volume or volume of specific frequency) of the work machine 40 via the remote speaker 222 is reduced or the audio output of the work machine 40 via the remote speaker 222 is stopped (FIG. 4/STEP 113). To be specific, the remote speaker 222 is muted so that no audio is output from the remote speaker 222, by controlling the output of the remote speaker 222. The audio output of the work machine 40 via the remote speaker 222 is stopped, by reducing the volume output from the remote speaker 222, or by reducing the volume of a specific frequency or muting the specific frequency. With this, even if audio that may cause audio feedback is included in the work machine-side audio, the remote microphone 214 no longer collects audio that may cause audio feedback, and audio feedback can be prevented.

Actuation of the work machine 40 based on an operation mode of the remote operation mechanism 211 is restricted (FIG. 4/STEP 121). To be specific, a normal actuation amount f(x) of the lower travel body 41 and/or the upper rotation body 42 and/or the work mechanism 44 with respect to an operation amount x of the operation lever, the travel pedal, and the like constituting the remote operation mechanism 211 is controlled to be a restricted actuation amount $\alpha f(x)(0 \leq \alpha < 1)$. The coefficient "α" is appropriately set in accordance with the volume of audio produced by actuation of the lower travel body 41 and/or the upper rotation body 42 and/or the work mechanism 44. That is, when actuation of the work machine 40 is restricted, the actuation amount of the restricted actuation of the work machine 40 with respect to the operation amount x of the operation lever is lower than when the operation of the work machine 40 is not restricted. With this, the restricted actuation is performed slowly (performed at a lower than normal speed) or the restricted operation is stopped. This processing is for restricting actuation of the work machine 40 based on the operation mode of the remote operation mechanism 211 in accordance with a degree of recognition of conditions of the work machine 40 and the surrounding area of the work machine 40 by the operator operating the remote operation device 20. Normally speaking, the operator can grasp the conditions of the work machine 40 and the surrounding area of the work machine 40 based on audio of the work machine 40 output from the remote speaker 222. However, when the audio output of the work machine 40 is stopped (FIG. 4/STEP 113), it is difficult to grasp the conditions of the work machine 40 and the surrounding area of the work machine 40. Accordingly, actuation of the work machine 40 based on the operation mode of the remote operation mechanism 211 is restricted in this processing (FIG. 4/STEP 121). Note that the actuation restriction processing may be omitted.

When actuation of the work machine 40 based on the operation mode of the remote operation mechanism 211 is restricted (FIG. 4/STEP 121), actuation of only a portion of the work machine 40 may be restricted. To be specific, actuation may be permitted based on an operation mode of the remote operation mechanism 211 in which the lower travel body 41 and/or the upper rotation body 42 is restricted and the work mechanism 44 is not restricted, with respect to the operation amount x of the operation lever, the travel pedal, and the like. In this case, the operator can accurately grasp the conditions of the work mechanism 44, since an image of a front of the upper rotation body 42 captured by the actual machine imaging device 412 is output to the remote image output device 221. Therefore, a reduction in operability can be minimized by not restricting the work mechanism 44 allowing a high degree of recognition. When an image capturing a travel direction of the lower travel body 41 is acquired by the actual machine imaging device 412, it is possible not to restrict actuation of the lower travel body 41.

Actuation conditions of the work machine 40 are recognized (FIG. 4/STEP 130). The actuation conditions of the work machine 40 are recognized by the remote operation assistance device 10 included in the remote control device 200, by using a signal or data indicating the actuation conditions of the work machine 40 transmitted from the work machine 40 to the remote operation device 20. The signal or the data for the recognizing includes the actuation conditions, such as the number of rotations of the engine, the number of rotations of the pump, and the like detected based on an output signal of a sensor equipped in the work machine 40. The signal or the data may include a discharge pressure of the pump, a pressure applied to each cylinder, or the like detected by a pressure sensor. A signals or data such as an actuation state or orientation conditions of the lower travel body 41 and/or the upper rotation body 42 and/or the work mechanism 44 detected by an angle sensor or a cylinder stroke sensor, and an image captured by the actual machine imaging device 412 may be recognized.

Simulated audio simulating audio of the work machine 40 is output from the remote speaker 222, based on the recognized actuation conditions of the work machine 40 (FIG. 4/STEP 132). Data indicating a correlation between the actuation conditions of the work machine 40 and data of the simulated audio may be stored in a memory device included in the remote operation assistance device 10. The simulated audio may be generated based on the data indicating the correlation with the actuation conditions of the work machine 40 and data of the simulated audio. For example, the audio of the prime mover and the audio of the hydraulic motor of the work machine 40 is output from the remote speaker 222 as simulated audio, and the simulated audio is changed based the number of rotations of the engine or the number of rotations of the pump of the work machine 40. The audio of the prime mover and the audio of the hydraulic motor increase in volume, frequency, and noise as the number of rotations increases, but appropriate information is provided for allowing the operator to grasp job site conditions of the work machine 40 and a surrounding area of a work site thereof, by changing the volume and the noise of the simulated audio corresponding thereto.

The simulated audio may include sound of the bucket 445 making contact with a work target object as the sound of the work mechanism 44. In this case, for example, conditions in which the bucket 445 comes into contact with the work target object are recognized based on an image captured by the actual machine imaging device 412 and the actuation state and orientation conditions of the work mechanism 44, and the audio produced when the bucket 445 comes into contact with the work target object is output from the remote speaker 222. The simulated audio may include sound of one work machine 40 being a remote operation target, as well as audio of another work machine 40 and/or another vehicle such as a truck present in a vicinity of the one work machine 40. In this case, for example, it is determined whether another work machine 40, a vehicle, or the like is included in an image captured by the actual machine imaging device 412, and audio is output from the remote speaker 222 when another work machine 40, a vehicle, or the like is included.

Simulated audio may be output from the remote speaker 222 regardless of the actuation conditions of the work machine 40 at the present time. For example, a chronological order of the work machine-side audio in a specified period in the past (preferably a specified period immediately preceding the present time) may be stored in a memory device, and the chronological order of the work machine-side audio in the specified period may be read from the memory device and output from the remote speaker 222 as the simulated audio. The output processing of the simulated audio may be omitted.

When the non-output state is determined in which the actual machine speaker 422 does not output speech input to the remote microphone 214 in the remote operation device 20 (FIG. 4/NO in STEP 110), audio of the work machine 40 is output via the remote speaker 222 (FIG. 4/STEP 112).

Actuation of the work machine 40 based on the operation mode of the remote operation mechanism 211 is controlled to be normal (FIG. 4/STEP 122). To be specific, the normal actuation amount f(x) of the lower travel body 41 and/or the upper rotation body 42 and/or the work mechanism 44 with respect to the operation amount x of the operation lever constituting the remote operation mechanism 211 is permitted.

Operation and Effects

According to the remote operation assistance device 10 and the remote operation assistance system exhibiting the above-described functions, the output of the work machine-side audio (audio collected by the actual machine external microphone 414) via the remote speaker 222 is reduced or the output of the remote speaker 222 is stopped, when the remote operation device-side audio (audio collected by the remote microphone 214) is output via the actual machine speaker 422 (see FIG. 4/YES in STEP 110→ . . . →STEP 113). Thus, collection via the remote microphone 214 of the remote operation device-side audio output from the remote speaker 222 is suppressed. With this, operability can be enhanced since audio feedback at the actual machine external microphone 414 and the actual machine speaker 422, and audio feedback at the remote microphone 214 and the remote speaker 222 is avoided (see FIG. 5A and FIG. 5B).

Since audio feedback is avoided by controlling the output of the remote speaker 222, a configuration, control, and the like of the work machine 40 is not complicated. In particular, when a plurality of work machines 40 are selectively remotely operated by the remote operation assistance device 10, it is not necessary to provide each work machine 40 with a function for avoiding audio feedback, thereby reducing costs and simplifying management. Even when performing control for avoiding audio feedback, it is possible to acquire the work machine-side audio collected by the remote microphone 214 via the network when, for example, operation data of the work machine 40 is recorded to a server or the like, since the audio data information corresponding to the sound collected by the remote microphone 214 is transmitted to the network.

When the remote operation device-side audio is output via the actual machine speaker 422, the simulated audio is output to the remote speaker 222 instead of the work machine-side audio (see FIG. 4/YES in STEP 110→ . . . →STEP 132). Thus, a sense of discomfort given to the operator is reduced, which may reduce the possibility of inappropriate forms of remote operation of the work machine 40 by the operator more than when the work machine-side audio is not output from the remote speaker 222.

The simulated audio is output in accordance with the actuation conditions of the work machine 40 (see FIG. 4/STEP 130→STEP 132). With this, simulated audio simulating the work machine-side audio that may be collected by the actual machine external microphone 414 is output from the remote speaker 222, taking into consideration the actual actuation conditions of the work machine 40. Thus, a sense of discomfort given to the operator is further reduced, which may further reduce the possibility of inappropriate forms of remote operation of the work machine 40 by the operator.

When the output of the work machine-side audio via the remote speaker 222 is reduced, actuation of the work machine 40 based on the operation mode of the remote operation mechanism 211 is suppressed (see FIG. 4/YES in STEP 110→ . . . →STEP 113→STEP 121). This makes it possible to restrict remote operation of the work machine 40 by the operator in a situation where it is difficult to grasp the conditions of the work machine 40 and the job site in the surrounding area of the work site by using the work machine-side audio.

Other Embodiments According to Present Invention

In the present embodiment, the remote operation assistance device 10 is included in the remote control device 200 (or installed in the remote operation device 20), but the remote operation assistance device 10 may also be included in the actual machine control device 400 (or installed in the work machine 40) as another embodiment. As still another embodiment, the remote operation assistance device 10 may be included in an external instrument or an external computer such as a server that is communicable with the remote operation device 20 and the work machine 40 via the network.

In the present embodiment, one of the output state in which the function of collecting audio from the space of the remote operation device 20 is enabled or the non-output state in which the function of collecting audio is disabled is designated through the push button-type switch (switching device), but it may be determined whether audio input to the remote microphone 214 is human speech, and as a result of the determination, set the output state in which the function of collecting audio from the space of the remote operation device 20 is enabled, when the audio is human speech, as another embodiment. According to this configuration, the switch (switching device) can perform switching without the operator performing a switch operation on the switch (switching device).

In the present embodiment, audio feedback due to output control of the remote speaker 222 is avoided, but audio feedback may be avoided by temporarily disabling a sound collection function of the actual machine external microphone 414, the actual machine internal microphone 436, or the like as another embodiment. According to the configuration, it is possible to suppress battery consumption of the work machine 40 when sound collection by the actual machine external microphone 414, the actual machine internal microphone 436, or the like is stopped, and to reduce data volume since the audio data transmitted from the work machine 40 to the network becomes single-frequency.

As another embodiment, transmission to the network of the audio data of the audio collected by the actual machine external microphone 414, the actual machine internal microphone 436, or the like may be stopped. According to the configuration, battery consumption of the work machine 40 can be suppressed when audio data is not transmitted.

In the present embodiment, the simulated audio is output to the remote speaker 222 in accordance with the actuation conditions of the work machine 40, but the simulated audio may be output to the remote speaker 222 in accordance with an operation mode of the remote operation lever of the remote operation mechanism 211 as another embodiment. According to the configuration, it is possible to instantly output the simulated audio to the remote speaker 222 based on the operation mode of the remote operation mechanism 211, and to reduce a sense of discomfort given to the operator which may reduce the possibility of inappropriate forms of remote operation of the work machine 40 by the operator, even when a delay occurs until the work machine 40 is actuated based on the operation mode of the remote operation mechanism 211.

| Reference Signs List | |
|---|---|
| 10 | remote operation assistance device |
| 20 | remote operation device |
| 200 | remote control device |
| 210 | remote input interface |
| 211 | remote operation mechanism |
| 214 | remote microphone |
| 220 | remote output interface |
| 221 | remote image output device |
| 222 | remote speaker |
| 224 | remote communication instrument |
| 40 | work machine |
| 41 | lower travel body |
| 42 | upper rotation body |
| 42C | cab (driver's cabin) |
| 44 | work mechanism |
| 445 | bucket |
| 400 | actual machine control device |
| 410 | actual machine input interface |
| 412 | actual machine imaging device |
| 414 | actual machine external microphone |
| 420 | actual machine output interface |
| 422 | actual machine speaker |
| 424 | actual machine communication instrument |

The invention claimed is:

1. A remote operation assistance system for assisting work of a work machine via a remote operation device, the remote operation assistance system comprising:

an actual machine microphone that is installed in the work machine and collects audio from the work machine side as work machine-side audio;

a remote speaker that is installed in the remote operation device and outputs the work machine-side audio collected via the actual machine microphone;

a remote microphone that is installed in the remote operation device and collects audio from the remote operation device side as remote operation device-side audio;

an actual machine audio processing device that is installed in the work machine and receives audio information data information based on audio of the remote operation device-side collected by the remote microphone, to output electrical signals corresponding to the audio information;

an actual machine internal microphone that is installed in the work machine and collects sounds in an internal space of a cab constituting a driver's cabin of the work machine;

an actual machine output audio selection device that is installed in the work machine and receives, as input, electrical signals corresponding to sounds collected by the actual machine microphone and the electrical signals output by the actual audio processing device, to output the electrical signals corresponding to the sounds collected by the actual machine internal microphone or the electrical signals corresponding to the audio of the remote operation device-side collected by the remote microphone;

an actual machine speaker that is installed in the work machine and outputs audio based on output of the actual machine output audio selection device; and a remote operation assistance device that is installed in the remote operation device and constitutes a processor, wherein the remote operation assistance device reduces output of the work machine-side audio via the remote speaker or stops output of the work machine-side audio via the remote speaker, in a case where the remote operation device-side audio is output via the actual machine speaker.

2. The remote operation assistance system for the work machine according to claim 1, wherein the remote operation assistance device (i) outputs the work machine-side audio via the remote speaker in a case where the remote operation device-side audio is not output via the actual machine speaker, and (ii) outputs the work machine-side audio via the remote speaker at a reduced rate more than when the remote operation device-side audio via the actual machine speaker or stops the output from the remote speaker is stopped, when the remote operation device-side audio via the actual machine speaker.

3. The remote operation assistance system for the work machine according to claim 1, further comprising a switching device that switches between an output state in which the remote operation device-side audio is output via the actual machine speaker and a non-output state in which the remote operation device-side audio is not output, wherein the remote operation assistance device outputs (i) the work machine-side audio via the remote speaker in a case where the non-output state is designated by the switching device, and (ii) outputs the work machine-side audio via the remote speaker at a reduced rate more than when the remote operation device-side audio via the actual machine speaker or stops the output from the remote speaker is stopped, when the output state is designated by the switching device.

4. The remote operation assistance system for the work machine according to claim 1, wherein the remote operation assistance device outputs simulated audio simulating the work machine-side audio is output to the remote speaker, when the remote operation device-side audio via the actual machine speaker.

5. The remote operation assistance system for the work machine according to claim 4, further comprising an actual machine actuation conditions recognition element that recognizes actuation conditions of the work machine, wherein the remote operation assistance device outputs the simulated audio generated based on the actuation conditions of the work machine recognized by the actual machine actuation conditions recognition element to the remote speaker.

6. The remote operation assistance system for the work machine according to claim 1, further comprising a notification device that is installed in the remote operation device and outputs a notification in accordance with a control by the remote operation assistance device, wherein, when the audio control device reduces the output of the work machine-side audio via the remote speaker or stops the output from the remote speaker, the remote operation assistance device controls the notification device to output the notification of reducing the output of the work machine-side audio or stopping the output from the remote speaker.

7. The remote operation assistance system for the work machine according to claim 1, wherein the remote operation assistance device (i) actuates the work machine based on an operation mode of a remote operation mechanism that is installed in the remote operation device and accepts an operation by an operator in a case where the remote operation device-side audio is not output via the actual machine speaker, and (ii) restricts actuation of the work machine based on the operation mode of the remote operation mechanism in a case where the remote operation device-side audio via the actual machine speaker.

* * * * *